(12) United States Patent
Guim Bernat et al.

(10) Patent No.: US 12,422,989 B2
(45) Date of Patent: Sep. 23, 2025

(54) MEMORY SCHEMES FOR INFRASTRUCTURE PROCESSING UNIT ARCHITECTURES

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 882 days.

(21) Appl. No.: 17/412,971

(22) Filed: Aug. 26, 2021

(65) Prior Publication Data

US 2021/0389880 A1    Dec. 16, 2021

(51) Int. Cl.
*G06F 3/06*    (2006.01)

(52) U.S. Cl.
CPC .......... *G06F 3/0613* (2013.01); *G06F 3/0635* (2013.01); *G06F 3/0679* (2013.01)

(58) Field of Classification Search
CPC ..... G06F 3/0613; G06F 3/0635; G06F 3/0679
See application file for complete search history.

(56) References Cited

U.S. PATENT DOCUMENTS

| | | | |
|---|---|---|---|
| 10,509,764 B1 * | 12/2019 | Izenberg | G06F 16/22 |
| 10,846,014 B2 | 11/2020 | Gilsdorf et al. | |
| 10,885,004 B2 | 1/2021 | Kumar et al. | |
| 2014/0115279 A1 * | 4/2014 | Chirca | G06F 21/78 |
| | | | 711/151 |
| 2018/0004454 A1 * | 1/2018 | Sampathkumar | G06F 3/0659 |
| 2019/0087218 A1 * | 3/2019 | Loftus | H04L 49/70 |
| 2021/0117345 A1 * | 4/2021 | Singh | G06F 13/18 |
| 2023/0409514 A1 * | 12/2023 | Bshara | H04L 67/1097 |

* cited by examiner

Primary Examiner — Prasith Thammavong
(74) Attorney, Agent, or Firm — Compass IP Law PC

(57) ABSTRACT

Systems, apparatuses, and methods provide for memory management where an infrastructure processing unit bypasses a central processing unit. Such an infrastructure processing unit determines if incoming packets of memory traffic trigger memory rules stored by the infrastructure processing unit. The incoming packets are routed to the central processing unit in a default mode when the incoming packets do not trigger the memory rules. Conversely, the incoming packets are routed to the infrastructure processing unit and bypass the central processing unit in an inline mode when the incoming packets trigger the memory rules. A memory architecture communicatively coupled to the central processing unit receives a set of atomic transactions from the infrastructure processing unit that bypasses the central processing unit and performs the set of atomic transactions from the infrastructure processing unit.

20 Claims, 8 Drawing Sheets

MEMORY SCHEMES FOR INFRASTRUCTURE PROCESSING UNIT ARCHITECTURES

TECHNICAL FIELD

Embodiments generally relate to memory controllers. More particularly, embodiments relate to memory controllers to manage advanced memory schemes for high throughput infrastructure processing unit architectures.

BACKGROUND

Smart network interface controllers (SmartNICs) have been gaining popularity in recent times. In particular, such SmartNICs technologies have been introduction in cloud environments. For example, some SmartNICs can help offload certain tasks from central processing units (CPUs). Similarly, infrastructure processing units (IPU) offer a programmable networking device designed for cloud and communication service providers to reduce overhead and free up performance for CPUs.

COMPUTE EXPRESS LINK (CXL) is an open industry standard interconnect typically involving high-bandwidth, low-latency connectivity between a host processor and other devices. The CXL transaction layer includes three dynamically multiplexed sub-protocols on a single link. These three sub-protocols are called CXL.io, CXL.cache, and CXL.memory. The CXL.io sub-protocol is directed to discovery configuration, register access, interrupts, etc. The CXL.cache sub-protocol is directed to device access to processor memory. The CXL.memory sub-protocol is directed to processor access to device attached memory.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
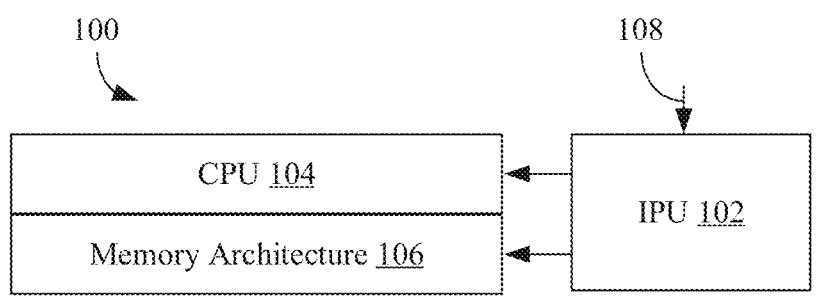
FIG. 1 is a block diagram of an example computing platform according to an embodiment.

As will be described in greater detail below, procedures and system are implemented to perform memory management where an infrastructure processing unit bypasses a central processing unit. In some implementations described herein, the infrastructure processing unit determines if incoming packets of memory traffic trigger memory rules stored by the infrastructure processing unit. The incoming packets are routed to the central processing unit in a default mode when the incoming packets do not trigger the memory rules. Conversely, the incoming packets are routed to the infrastructure processing unit and bypass the central processing unit in an inline mode when the incoming packets trigger the memory rules. A memory architecture communicatively coupled to the central processing unit receives a set of atomic transactions from the infrastructure processing unit that bypasses the central processing unit and performs the set of atomic transactions from the infrastructure processing unit.

As will be described in greater detail below, CXL.cache and CXL.memory provide one technology for infrastructure processing units (IPUs) to collaboratively operate on the same memory space as CPUs. Advantageously, such collaborative operations of IPUs and CPUs on the same memory space as CPUs enable some efficiencies with regard to data movements, shared operations, and granularities of offload operations between CPUs and IPUs. While some examples described below refer to the CXL.memory and CXL.cache protocols, it will be understood that the underlying concepts may be utilized in other interconnect protocols.

In some implementations, a CXL-based IPU and a CPU work collaboratively to process an application in a CXL environment. For example, sharing the same address space and having memory access semantics advantageously elevates IPU usages akin to multi-socket usages, with all the benefits that come from IPUs. For example, some operations on a shared memory region between the CPU and the IPU, for example, involve a shared database buffer. Involving a shared database buffer advantageously opens the opportunity to offload a large part of database operations for event stream processing, where a huge potential number of requests flow over the network into the database. Several of the most demanding of such scenarios include high-speed trading, online booking systems, consolidation of internet of things (IoT) data from devices and gateways, measurements from large research projects, the like, and/or combinations thereof.

As will be described in greater detail below, some shared memory operation problems will be discussed for an effective offloading from a CPU to an IPU. For example, the need for atomicity, will be discussed. As used herein the term "atomicity," "atomic transactions," and the like, refer to the result of preventing different memory transactions from interfering with one another. For example, techniques for such atomic transactions ensure data coherency when more than one process and/or user is trying to access a database at the same time. One such example transaction occurs when a server allows several clients to use the server concurrently. In the case of read-only operations, where no one is modifying data, and coherence is not needed, the CXL.memory protocol or memory semantics are sufficient to provide coherence. For read-write operations, in cases where one just needs to make sure that the latest copy is available to all (e.g., there's no atomicity requirement), the CXL.cache protocol is capable of providing coherence. However, in cases where atomic operations from an IPU are required for memory regions that are shared with multiple CPUs or IPUs, synchronization between the IPUs and CPUs via application software stacks does not scale, which disadvantageously negates or restricts the processing capabilities of the IPUs.

Additionally, while CPUs may utilize technologies (e.g., Transactional Synchronization Extensions (TSX)) to monitor, speculatively proceed, and enable hardware rollback when required, there are some potential drawbacks. For example, an IPU memory access path typically provides no hooks for atomic groups of reads or groups of writes (e.g., with CXL-bus monitors) to make sure no other operations took place in between. Similarly, an IPU memory access path typically provides no via CXL for atomic read-modify-write support in hardware.

FIG. 1 is a block diagram of an example computing platform 100 according to an embodiment. In the illustrated example, the computing platform 100 includes one or more infrastructure processing units 102 in communication with a memory architecture 106 communicatively coupled to a central processing unit 104.

In some examples, the computing platform 100 is embodied as any type of electronic device in a variety of configurations and form factors for performing the functions described herein. For example, the computing platform 100 is implementable as, without limitation, a smart phone, a tablet computer, a wearable computing device, a laptop computer, a notebook computer, a mobile computing device, a cellular telephone, a handset, a messaging device, a vehicle telematics device, a server computer, a workstation, a distributed computing system, a multiprocessor system, a consumer electronic device, the like, and/or any other computing device configured to perform the functions described herein.

In some examples, the infrastructure processing unit 102 is implementable on any properly configured smart network interface controller (SmartNIC), including, without limitation, SmartNICs, reconfigurable SmartNICs, the like, and/or combinations thereof. In such an implementation, the infrastructure processing unit 102 include a processor in addition to a network interface, such that the infrastructure processing unit 102 are able to perform one or more compute functions.

In some examples, the infrastructure processing unit 102 includes logic. The logic of the infrastructure processing unit 102 is implementable via transistor array, other integrated circuit/IC components, the like, and/or combinations thereof. For example, the logic of the infrastructure processing unit 104 is integrated onto a semiconductor die, as will be discussed in greater detail below with respect to FIG. 8. In some examples, the logic of the infrastructure processing unit 102, which may include one or more of configurable or fixed-functionality hardware, is configured to perform one or more aspects of the method 500 (FIG. 5) and/or the method 700 (FIG. 7), which are discussed in more detail below.

As will be described in greater detail below, the infrastructure processing unit 102 stores memory rules. For example, the infrastructure processing unit 102 determines if one or more incoming packets of memory traffic 108 trigger the memory rules. The incoming packets are routed to the central processing unit 104 in a default mode when the incoming packets do not trigger the memory rules. Alternatively, the incoming packets are routed to the infrastructure processing unit 104 and bypass the central processing unit 104 in an inline mode when the incoming packets trigger the memory rules.

In some examples, the central processing unit 104 is implementable on any properly configured processing unit, including, without limitation, one or more mobile application processors, one or more desktop or server central processing units including multi-core central processing units, one or more parallel processing units, as well as one or more graphics processors or special purpose processing units, without departure from the scope of the embodiments described herein.

In some examples, the memory architecture 106 included logic. The logic of the memory architecture 106 is implementable via transistor array, other integrated circuit/IC components, the like, and/or combinations thereof. For example, the logic of the memory architecture 106 is integrated onto a semiconductor die, as will be discussed in greater detail below with respect to FIG. 8. In some examples, the logic of memory architecture 106, which may include one or more of configurable or fixed-functionality hardware, is configured to perform one or more aspects of the method 600 (FIG. 6) and/or the method 700 (FIG. 7), which are discussed in more detail below.

As will be described in greater detail below, the memory architecture 106 provides for receiving a set of one or more atomic transactions. For example, the set of one or more atomic transactions are received, via the memory architecture 106, from the infrastructure processing unit 102, which the central processing unit 104. In some examples, the memory architecture 106 performs the set of one or more atomic transactions from the infrastructure processing unit 102.

Additional and/or alternative details regarding the computing platform 100 are described in greater detail below in the description of FIGS. 2-4.

Figure 2:
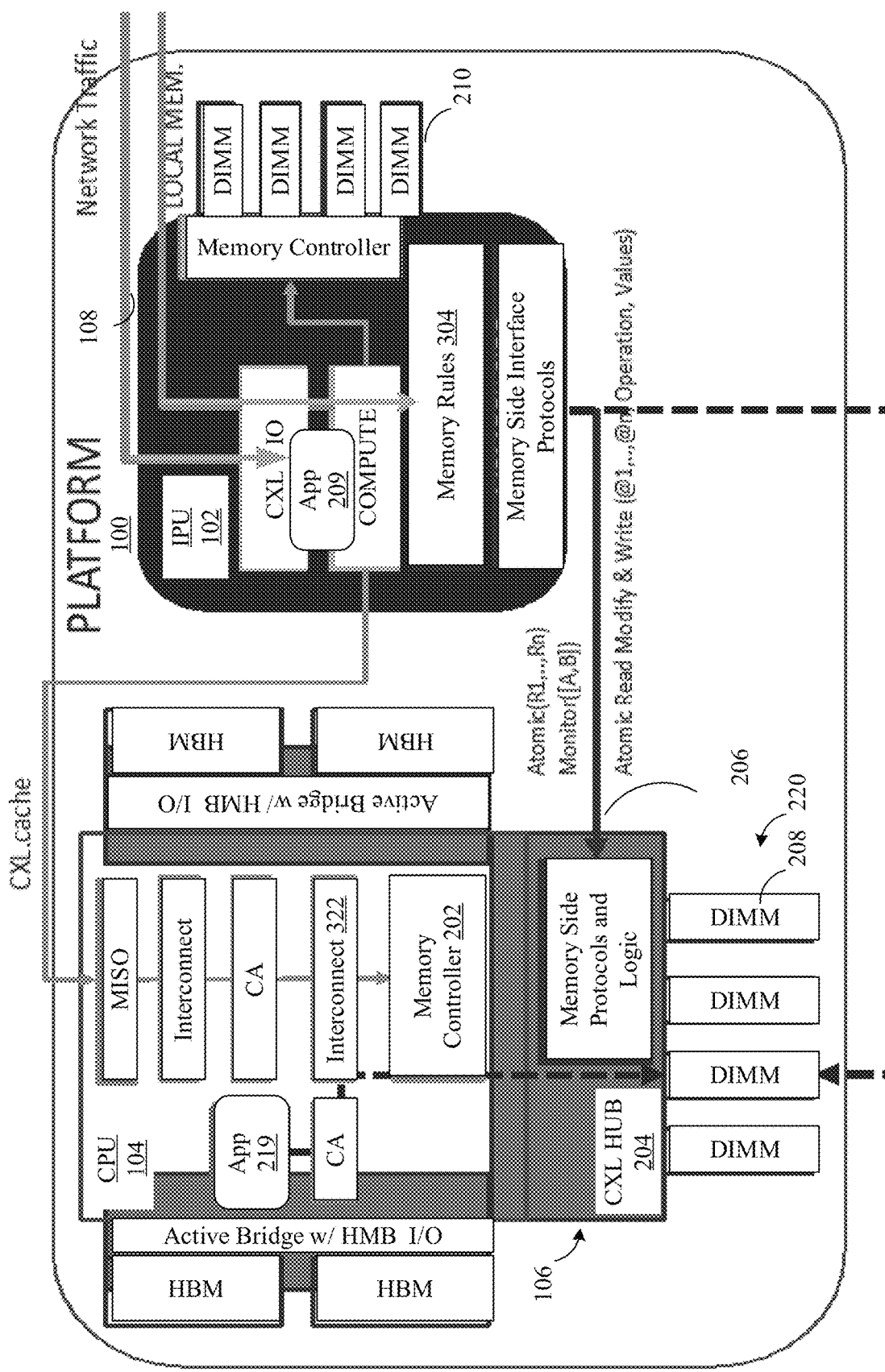
FIG. 2 is an illustration of another example of a computing platform according to an embodiment.

FIG. 2 is an illustration of another example of a computing platform 200 according to an embodiment. In the illustrated example, the infrastructure processing unit 102 and the memory architecture 106 include mechanisms to permit the designation of specific memory traffic to bypass the central processing unit 104 flows while still allowing the maintenance of memory consistency at the application level.

In the illustrated example, the building blocks of such a mechanism to bypass the central processing unit 104 is capable of being implemented in a set of programmable logic in the infrastructure processing unit 102. For example, such a set of programmable logic in the infrastructure processing unit 102 permit the defining of memory range rules to direct payloads associated with such ranges to bypass the central processing unit 104. In this case, network packets matching a certain memory rule will use such a bypass. In such an example, the infrastructure processing unit 102 will read or write N memory lines in a designated bypass memory range using the CXL.memory protocol.

In the illustrated example, the building blocks of such a mechanism to bypass the central processing unit 104 is capable of being located in any place of the memory architecture 106 that is associated with a path where transactions need to cross. For example, such a mechanism in the logic of the memory architecture 106 is implementable in one or more of the following components: a memory controller 202, a memory monitor (not illustrated), a Compute Express Link hub 204, a Compute Express Link peer-to-peer communication channel 206, a dual in-line memory module 208, the like, and/or combinations thereof.

In operation, the memory architecture 106 supports an interface (and the corresponding logic) that allows to the infrastructure processing unit 102 to require an atomic execution for a set of reads or writes (e.g., or a set of atomic read, modify, or write operations to allow more complex memory updates). As will be described in greater detail below, these atomic operations are capable of coming with a priority, which is used to decide how critical is to execute the atomic operation in cases where there are pending requests that may conflict with the atomic operation.

Additionally, or alternatively, the memory architecture 106 supports an interface that is capable of allowing the infrastructure processing unit 102 to monitor certain type of memory ranges. For example, such a functionality is used by the infrastructure processing unit 102 to take specific actions when the central processing unit 104 performs modifications to a specific memory range that is being monitored. In one example, the infrastructure processing unit 102 will notify peer nodes that a particular memory space has been updated by the central processing unit 104.

In some implementations, the ability of the infrastructure processing unit 102 to monitor certain type of memory ranges is governed by one or more permission flows. For example, an operating system (OS), an owner of a server, or the like is capable of specifying whether the infrastructure processing unit 102 has permission to modify certain memory ranges and/or monitor certain ranges. In some examples, such permissions are specific to certain applications. In such an example, a service with specific process identification running on the infrastructure processing unit 102 is capable of reading and writing to a certain range in accordance with a specific permission. For example, checking such permissions would include some level of data structure (e.g., a page table data structure) to check permissions.

Additionally, or alternatively, the infrastructure processing unit 102 is capable of running one or more applications 209 to performs one or more aspects of the method 500 (FIG. 5) and/or the method 700 (FIG. 7), which are discussed in more detail below. For example, application 209 running on the cores of the infrastructure processing unit 102 is capable of directly performing the communication of the set of one or more atomic transactions to the memory architecture 106 and/or direct the monitoring of memory ranges (e.g., by using side channel communication with the memory architecture 106).

Similarly, the central processing unit 104 is capable of running an application 219 to perform the same or similar operations as application 209 with respect to monitoring of memory ranges. For example, the application 219 running on the central processing unit 104 is capable of adding and/or modifying monitors to observe changes to memory made by the infrastructure processing unit 102. In such an example, the application 219 running on the central processing unit 104 is capable of allowing the central processing unit 104 to monitor certain memory ranges. For example, such a functionality is used by the central processing unit 104 to take specific actions when the infrastructure processing unit 102 performs modifications to a specific memory range that is being monitored. In one example, the central processing unit 104 will notify peer nodes that a particular memory space has been updated by the infrastructure processing unit 102.

In the illustrated example, a memory 210 is communicatively coupled to the infrastructure processing unit 102. In some embodiments, memory 210 comprises one or more memory modules, such as dual in-line memory modules (DIMMs). In some embodiments, the memory 210 is located on one or more integrated circuit chips that are distinct from an integrated circuit chip comprising the infrastructure processing unit 102 or may be located on the same integrated circuit chip as the infrastructure processing unit 102. The memory 210 is capable of comprising any suitable type of memory and is not limited to a particular speed or technology of memory in various embodiments.

In operation, the memory 210 is capable of storing various data and code used during operation of the infrastructure processing unit 102, as well as operating systems, applications, programs, libraries, and drivers. The memory 210 is capable of storing data and/or code, which includes sequences of instructions that are executed by the infrastructure processing unit 102.

In the illustrated example, a memory 220 is communicatively coupled to the central processing unit 104. In some embodiments, memory 220 comprises one or more memory modules, such as dual in-line memory modules (DIMMs). In some embodiments, the memory 220 is located on one or more integrated circuit chips that are distinct from an integrated circuit chip comprising the central processing unit 104 or may be located on the same integrated circuit chip as the central processing unit 104. The memory 220 is capable of comprising any suitable type of memory and is not limited to a particular speed or technology of memory in various embodiments.

For example, the memory 220 (and memory 210) is capable of being part of a storage device that includes non-volatile memory and/or volatile memory. Non-volatile memory is a storage medium that does not require power to maintain the state of data stored by the medium. In one embodiment, the memory structure is a block addressable storage device, such as those based on NAND or NOR technologies. A storage device may also include future generation nonvolatile devices, such as a three-dimensional (3D) crosspoint memory device, or other byte addressable write-in-place nonvolatile memory devices. In one embodiment, the storage device may be or may include memory devices that use silicon-oxide-nitride-oxide-silicon (SONOS) memory, electrically erasable programmable read-only memory (EEPROM), chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thiristor based memory device, or a combination of any of the above, or other memory. The term "storage device" may refer to the die itself and/or to a packaged memory product. In some embodiments, 3D crosspoint memory may comprise a transistor-less stackable cross point architecture in which memory cells sit at the intersection of word lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD235, JESD218, JESD219, JESD220-1, JESD223B, JESD223-1, or other suitable standard (the JEDEC standards cited herein are available at jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at jedec.org). Such standards (and similar standards) may be referred to as DDR-based standards and communication interfaces of the storage devices that implement such standards may be referred to as DDR-based interfaces.

In operation, the memory 220 is capable of storing various data and code used during operation of the computing platform 200, as well as operating systems, applications, programs, libraries, and drivers. The memory 220 is capable of storing data and/or code, which includes sequences of instructions that are executed by the central processing unit 104.

The memory 220 is communicatively coupled to the central processing unit 104, e.g., via an interconnect 222. The interconnect 222 is capable of being embodied as circuitry and/or components to facilitate input/output operations with the central processing unit 104, the memory 220, and other components of the computing platform 200. In some embodiments, the interconnect 222 form a portion of a system-on-a-chip (SoC) and are incorporated, along with the central processing unit 104, the memory 220, and/or other components of the computing platform 200, on a single integrated circuit chip.

Figure 3:
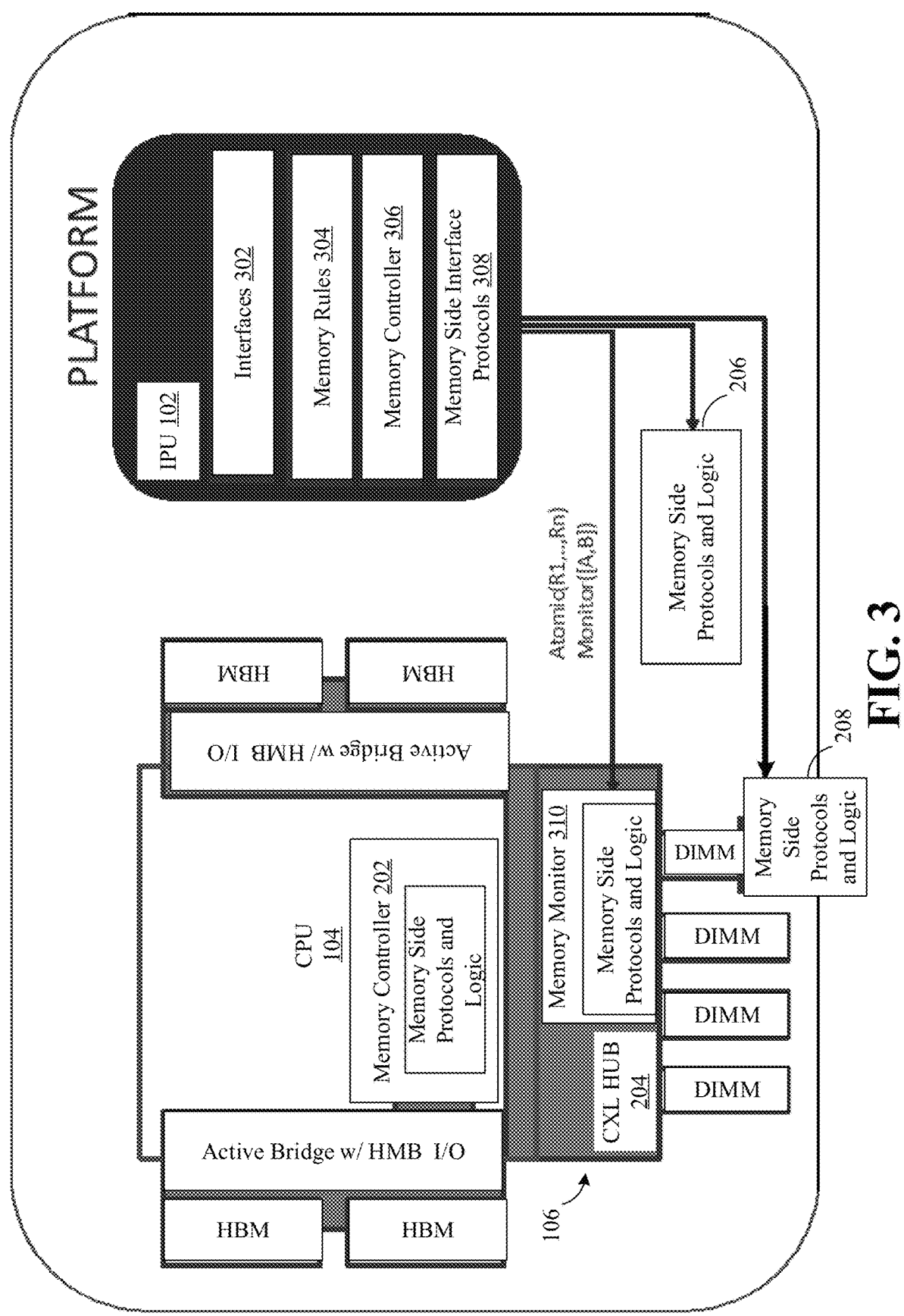
FIG. 3 is an illustration of a further example of a computing platform according to an embodiment.

FIG. 3 is an illustration of a further example of a computing platform 300 according to an embodiment. In the illustrated example, the infrastructure processing unit 102 includes a set of interfaces 302, a set of memory rules 304, a memory side controller 306, and/or a memory side interface protocol 308.

In the illustrated example, the set of interfaces 302 allow programing of and access to the infrastructure processing unit 102. For example, a first interface of the set of interfaces 302 allows operations to register, update or remove one or more memory rules 304. In some implementations, the memory rules 304 include an identification (ID) that identifies individual rules, a memory range that identifies network flows that need to be intercepted and redirected to the memory architecture 106, and/or a priority associated to network packets that need to be intercepted and forwarded to the memory architecture 106.

In another example, a second interface of the set of interfaces 302 allows applications running on the infrastructure processing unit 102 to perform a set of atomic operations. For example, the second interface of the set of interfaces 302 includes a list of operations (e.g., reads or writes, or read-modify-write operations) to be performed, a list of values to be used (e.g., in case of writes), and/or an associated priority of those operations.

In a further example, a third interface of the set of interfaces 302 allows applications running on the infrastructure processing unit 102 to register the monitoring of a particular memory range. For example, the third interface of the set of interfaces 302 includes and identification (ID) of the monitor entity and a memory range that is to be monitored.

In the illustrated example, the memory side controller 306 is to control the bypassing of some packets of memory traffic from the central processing unit 104 to the infrastructure processing unit 102, and the memory side interface protocol 308 is to control communication between the infrastructure processing unit 102 the memory architecture 106. For example, in a default mode packets of memory traffic would normally be forwarded for processing to the central processing unit 104 from the infrastructure processing unit 102. In an inline mode, the infrastructure processing unit 102 responsible to process the incoming packets of memory traffic and update the memory architecture 106 on the central processing unit 104 side. For example, in an inline mode, the infrastructure processing unit 102 will process incoming packets (e.g., remote direct memory access (RDMA) packets) of memory traffic and extract a memory range that is being aimed.

In operation, a memory range of incoming packets will be mapped against the memory rules 304 to identify if any of the memory rules 304 assert. In cases where the memory rules 304 do not assert, the packet will continue a normal flow to the central processing unit 104 in the default mode. In cases where the memory rules 304 do assert, the infrastructure processing unit 102 will extract from the packet any operations to be performed and translate those operations into a set of reads or writes (e.g., or reads, modify, and write operations) to be performed into memory. In some examples, a network payload may include multiple memory lines. The infrastructure processing unit 102 will generate an atomic set of transactions based on set of reads or writes (e.g., or reads, modify, and write operations) and send the atomic set of transactions to the memory architecture 106 along with an associated priority. As will be described in greater detail below, the memory architecture 106 will be responsible to execute the atomic set of transactions.

In the illustrated example, the building blocks of a mechanism to bypass the central processing unit 104 is capable of being located in any place of the memory architecture 106 that is associated with a path where transactions need to cross. For example, such a mechanism in the logic of the memory architecture 106 is implementable in one or more of the following components: the memory controller 202, a memory monitor 310, the Compute Express Link hub 204, the Compute Express Link peer-to-peer communication channel 206, the dual in-line memory module 208, the like, and/or combinations thereof.

In some examples, the logic of the infrastructure processing unit 102, which may include one or more of configurable or fixed-functionality hardware, is configured to perform one or more aspects of the method 500 (FIG. 5) and/or the method 700 (FIG. 7), which are discussed in more detail below.

Figure 4:
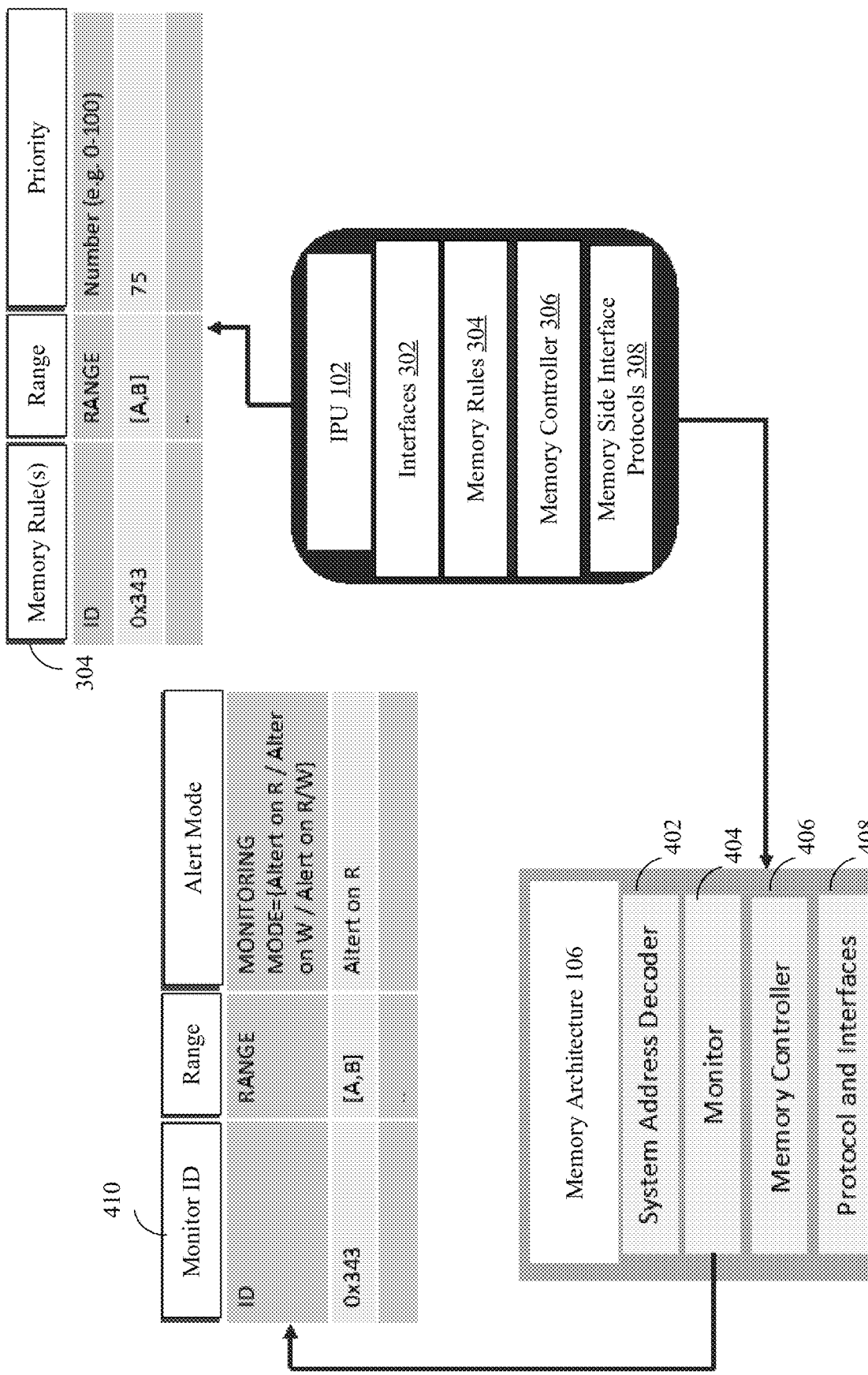
FIG. 4 is an illustration of an example diagram of an infrastructure processing unit and a memory architecture according to an embodiment.

FIG. 4 is an illustration of an example diagram of the infrastructure processing unit 102 and the memory architecture 106 according to an embodiment. In the illustrated example, the memory architecture 106 includes a system address decoder 402, a monitor 404, a memory controller 406, and/or a protocol and interfaces module 408.

In the illustrated example, the system address decoder 402 to match any read or write coming into the different monitor activities registered by the infrastructure processing unit 102.

In the illustrated example, the monitor 404 is to observe the different monitor activities registered by the infrastructure processing unit 102. For example, for incoming memory operation from the CPU side the monitor 404 will match the address of the memory with any monitoring rules 410. When there is a match between the address of the memory with any of the monitoring rules 410, the logic will generate a signal back to the infrastructure processing unit 102 indicating that the monitor that has been asserted.

In the illustrated example, the memory controller 406 is to perform the remote atomic operations that maybe required by the infrastructure processing unit 102. For example, the memory controller 406 includes a set of queues that to host the requests that are coming from the infrastructure processing unit 102 side. These queues are capable of containing different atomic requests with different priorities.

In some examples, the memory controller 406 includes logic to execute the atomic operations as well as put requests coming from the CPU that interfere with an atomic group on hold. Additionally, or alternatively, the logic is capable of executing the pending requests in a round robin fashion based on the priority. In some examples, the logic is capable of identifying pending atomic requests that aim to update memory ranges that are being heavily used by the CPU. Depending on the priority of the request, the logic is capable of applying some detail until the CPU side has done a certain number of requests. In such an example, the logic is capable of performing operations similar to a priority based round robin to alternate between the CPU and the infrastructure processing unit 102.

In the illustrated example, the protocol and interfaces module 408 is to implement interfaces and flows between the infrastructure processing unit 102 and the memory architecture 106.

Additionally, or alternatively, atomic read, modify, and write operations are accommodated in some implementations. For example, such atomic read, modify, and write operations allow more complex memory updates. In such an implementation, many of the details described above with respect to read or write operations will be utilized. Additionally, such atomic read, modify, and write operations will include a list of memory addresses that are being aimed by the operation, a list of values that are mapped into each of those memory addresses, and/or a list of what operation needs to be performed between the current value of the memory and the provided value.

In some examples, the logic of the memory architecture 106, which may include one or more of configurable or fixed-functionality hardware, is configured to perform one or more aspects of the method 600 (FIG. 6) and/or the method 700 (FIG. 7), which are discussed in more detail below.

Figure 5:
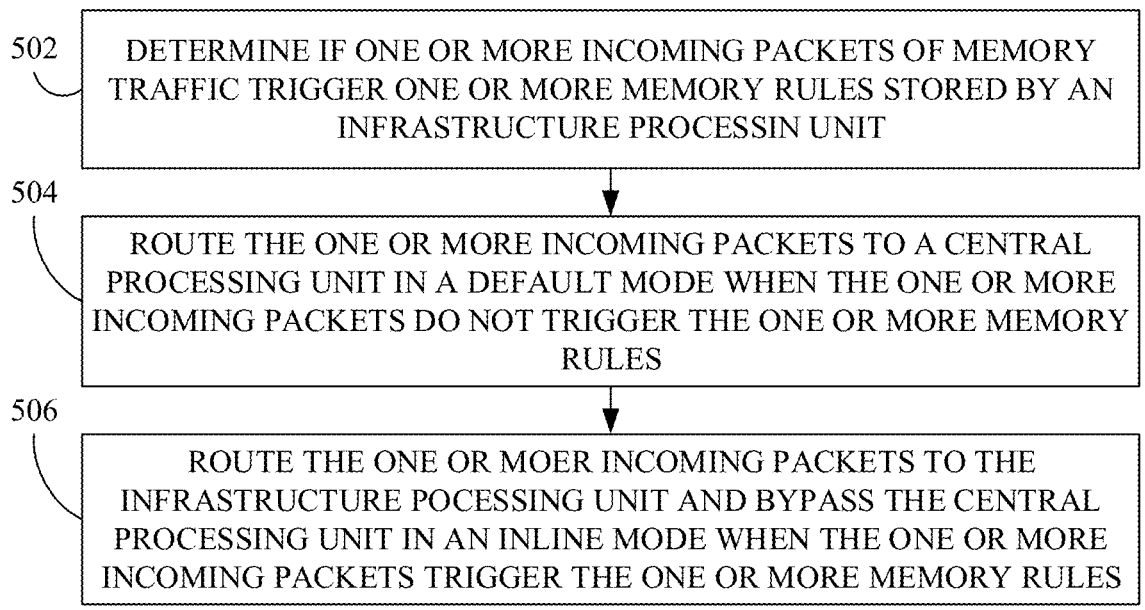
FIG. 5 is a flowchart of an example method of operating an infrastructure processing unit according to an embodiment.

FIG. 5 shows an example method 500 for operating an infrastructure processing unit according to an embodiment. The method 500 may generally be implemented in an infrastructure processing unit, such as, for example, the infrastructure processing unit 102 (e.g., see FIGS. 1-4), already discussed.

More particularly, the method 500 (as well as method 600 (FIG. 6), and method 700 (FIG. 7)) may be implemented in one or more modules as a set of logic instructions stored in a machine- or computer-readable storage medium such as random access memory (RAM), ROM, programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 500 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 502 provides for determining if one or more incoming packets of memory traffic trigger one or more memory rules. For example, the one or more memory rules are stored by an infrastructure processing unit.

Illustrated processing block 504 provides for routing the one or more incoming packets to a central processing unit. For example, the one or more incoming packets are routed to a central processing unit in a default mode when the one or more incoming packets do not trigger the one or more memory rules.

Illustrated processing block 506 provides for routing the one or more incoming packets to the infrastructure processing unit and bypassing the central processing unit. For example, the one or more incoming packets are routed to the infrastructure processing unit and bypass the central processing unit in an inline mode when the one or more incoming packets trigger the one or more memory rules.

Additional and/or alternative operations for method 500 are described in greater detail below in the description of FIG. 7.

Figure 6:
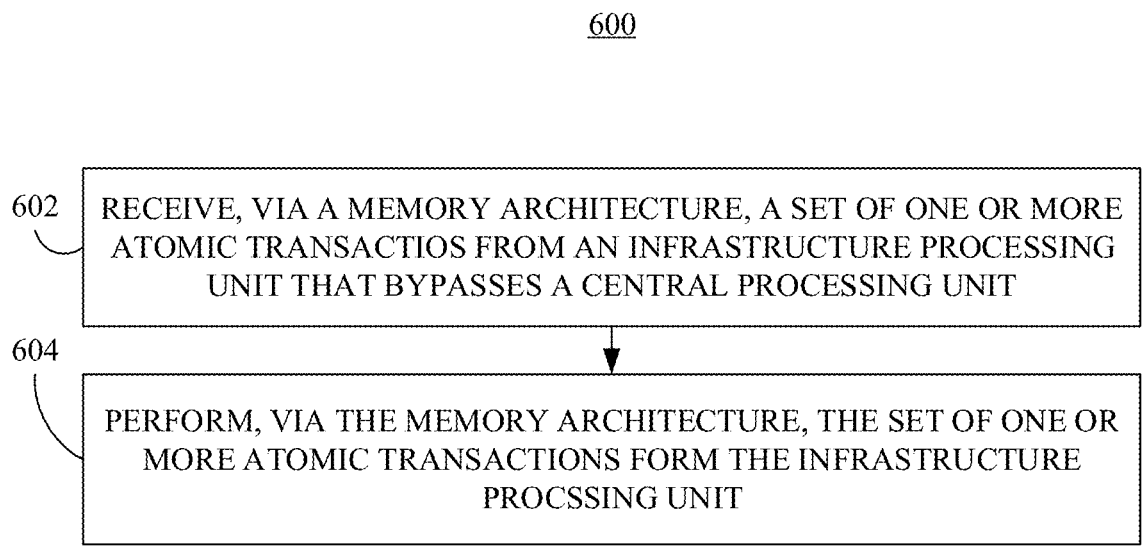
FIG. 6 is a flowchart of an example method of operating a memory architecture according to an embodiment.

FIG. 6 is a flowchart of an example of another method 600 for operating a memory architecture according to an embodiment. The method 600 may generally be implemented in a memory architecture, such as, for example, the memory architecture 106 (e.g., see FIGS. 1-4), already discussed.

Illustrated processing block 602 provides for receiving a set of one or more atomic transactions. For example, a set of one or more atomic transactions are received, via a memory architecture, from an infrastructure processing unit that bypasses a central processing unit.

Illustrated processing block 604 provides for performing the set of one or more atomic transactions. For example, the set of one or more atomic transactions from the infrastructure processing unit are performed via the memory architecture.

Additional and/or alternative operations for method 600 are described in greater detail below in the description of FIG. 7.

Figure 7:
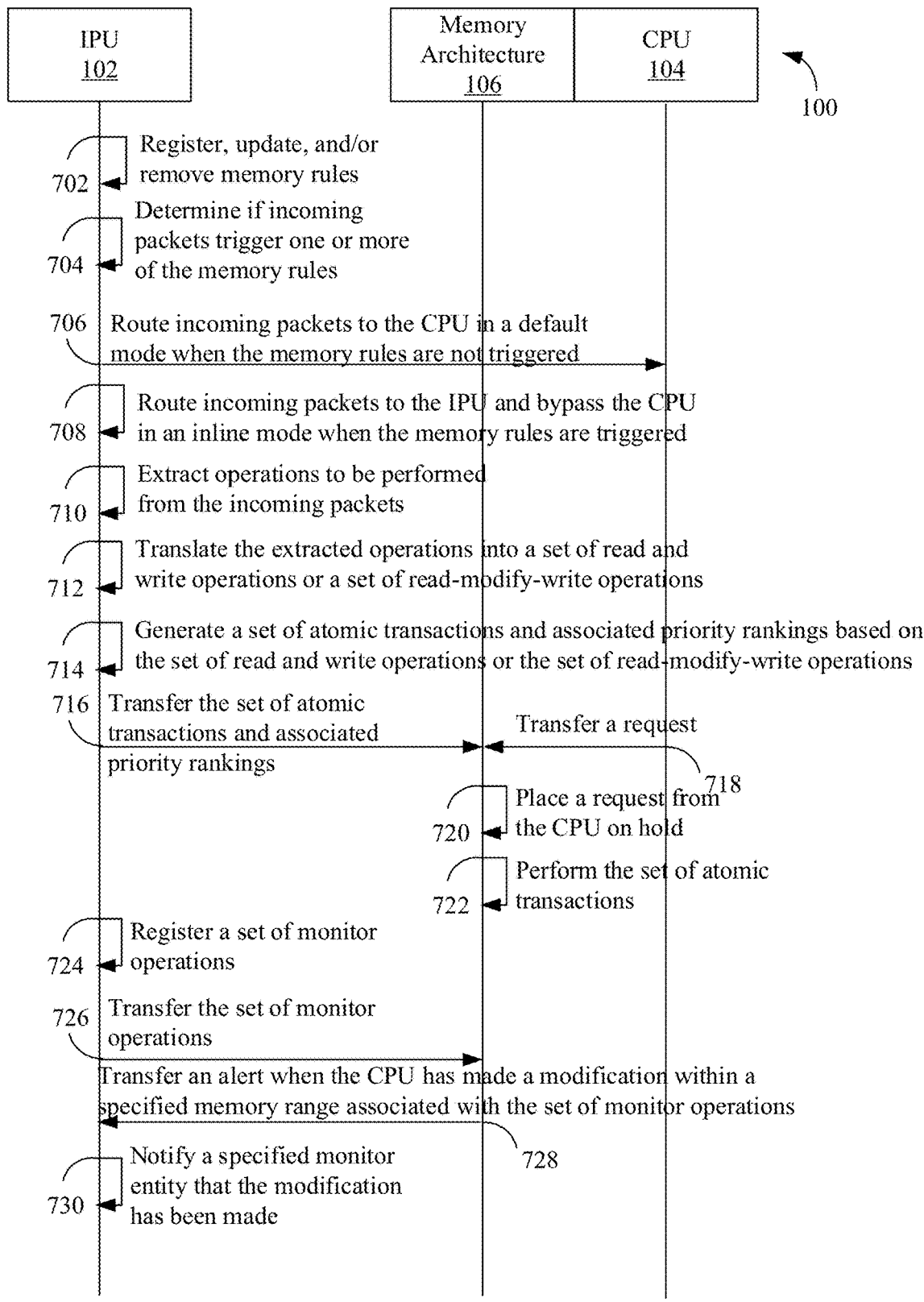
FIG. 7 is a flowchart of an example method of operating a computing platform according to an embodiment.

FIG. 7 is a flowchart of an example of a further method 700 for operating the computing platform according to an embodiment. The method 700 may generally be implemented in a memory controller, such as, for example, the computing platform 100 (e.g., see FIGS. 1-4), already discussed.

In the illustrated example, method 700 may be implemented via an infrastructure processing unit 102 in communication with a memory architecture 106 communicatively coupled to a central processing unit 104.

Illustrated processing block 702 provides for registering, updating, and/or removing memory rules. For example, the infrastructure processing unit performs a register operation, an update operation, a removal operation, the like, and/or combinations thereof with respect to the one or more memory rules.

In some implementations, the one or more memory rules include a memory range that identifies one or more network flows to be intercepted and redirected to the memory architecture associated with the central processing unit, and one or more priority rankings associated with a set of one or more atomic transactions.

Illustrated processing block 704 provides for determining if one or more incoming packets of memory traffic trigger one or more memory rules. For example, the one or more memory rules are stored by the infrastructure processing unit.

Illustrated processing block 706 provides for routing the one or more incoming packets to the central processing unit. For example, the one or more incoming packets are routed to the central processing unit in a default mode when the one or more incoming packets do not trigger the one or more memory rules.

Illustrated processing block 708 provides for routing the one or more incoming packets to the infrastructure processing unit and bypassing the central processing unit. For example, the one or more incoming packets are routed to the infrastructure processing unit and bypass the central processing unit in an inline mode when the one or more incoming packets trigger the one or more memory rules.

Illustrated processing block 710 provides for extracting operations to be performed from the one or more incoming packets. For example, the infrastructure processing unit extracts operations to be performed from the one or more incoming packets.

Illustrated processing block 712 provides for translating the extracted operations into a set of one or more read and write operations. For example, the infrastructure processing unit translates the extracted operations into a set of one or more read and write operations.

In some implementations, the extracted operations are translated into a set of one or more read and write operations. Additionally, or alternatively, the extracted operations are translated into a set of one or more read-modify-write operations.

Illustrated processing block 714 provides for generating a set of one or more atomic transactions and one or more associated priority rankings based on the set of one or more read and write operations. For example, the infrastructure processing unit generates a set of one or more atomic transactions and one or more associated priority rankings based on the set of one or more read and write operations.

In some implementations, the set of one or more atomic transactions and the one or more associated priority rankings are generated based on the set of one or more read and write operations. Additionally, or alternatively, the set of one or more atomic transactions and the one or more associated priority rankings are generated based on the set of one or more read-modify-write operations.

Illustrated processing block 716 provides for transferring a set of one or more atomic transactions. For example, a set of one or more atomic transactions and the one or more associated priority rankings are sent from the infrastructure processing unit while bypassing the central processing unit and received by the memory architecture.

Illustrated processing block 718 provides for transferring a one or more requests. For example, one or more requests are sent from the central processing unit and received by the memory architecture.

Illustrated processing block 720 provides for placing one or more requests from the central processing unit on hold. For example, the memory architecture places one or more requests from the central processing unit on hold when the one or more requests interfere with the performance of the set of one or more atomic transactions based on the one or more associated priority rankings.

Illustrated processing block 722 provides for performing the set of one or more atomic transactions. For example, the set of one or more atomic transactions from the infrastructure processing unit are performed via the memory architecture.

In some examples, the memory architecture hosts the set of one or more atomic transactions with the one or more associated priority rankings in a set of one or more queues. In such examples, the memory architecture performs the set of one or more atomic transactions based on the one or more associated priority rankings.

In some implementations, the memory architecture alternates performance of one or more requests from the central processing unit with the performance of the set of one or more atomic transactions from the infrastructure processing unit. For example, the memory architecture alternates performance of one or more requests from the central processing unit in a round robin with the performance of the set of one or more atomic transactions from the infrastructure processing unit based on the one or more associated priority rankings.

Illustrated processing block 724 provides for registering a set of one or more monitor operations. For example, the infrastructure processing unit registers a set of one or more monitor operations based on a specified memory range associated with a specified monitor entity.

Illustrated processing block 726 provides for provides for transferring the set of one or more monitor operations. For example, the infrastructure processing unit sends the set of one or more monitor operations to the memory architecture associated with the central processing unit.

Illustrated processing block 728 provides for transferring an alert from the memory architecture to the infrastructure processing unit. For example, the memory architecture sends an alert received by the infrastructure processing unit that the central processing unit has made one or more modifications within the specified memory range associated with the set of one or more monitor operations.

Illustrated processing block 730 provides for notifying the specified monitor entity that the one or more modifications have been made within the specified memory range. For example, the infrastructure processing unit notifies the specified monitor entity that the one or more modifications have been made within the specified memory range.

In some implementations, operations similar to one or more of processing blocks 724-730 are capable of being performed by the central processing unit. For example, the central processing unit is capable of adding and/or modifying monitors to observe changes to memory made by the infrastructure processing unit. In such an example, the central processing unit is capable of monitoring certain memory ranges. For example, such a functionality is used by the central processing unit to take specific actions when the infrastructure processing unit performs modifications to a specific memory range that is being monitored. In one example, the central processing unit will notify peer nodes that a particular memory space has been updated by the infrastructure processing unit.

Figure 8:
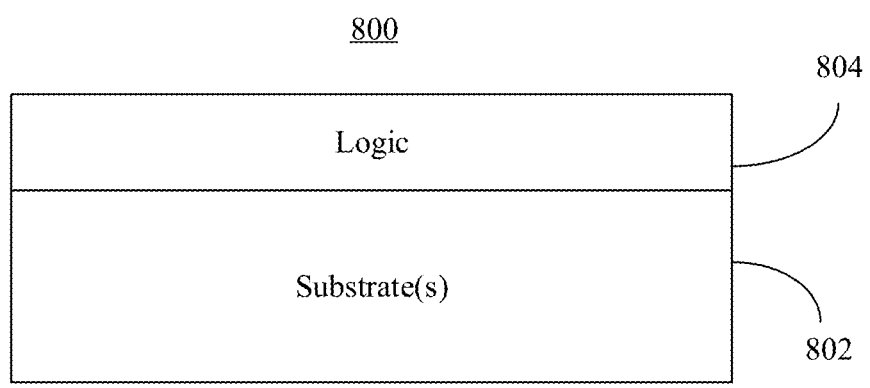
FIG. 8 is an illustration of an example of a semiconductor package apparatus according to an embodiment.

FIG. 8 shows a semiconductor apparatus 800 (e.g., chip and/or package). The illustrated apparatus 800 includes one or more substrates 802 (e.g., silicon, sapphire, gallium arsenide) and logic 804 (e.g., transistor array and other integrated circuit/IC components) coupled to the substrate(s) 802. In an embodiment, the logic 804 implements one or more aspects of the method 500 (FIG. 5), the method 600 (FIG. 6), and/or the method 700 (FIG. 7), already discussed.

Thus, when operated as an infrastructure processing unit, the logic 804 determines if incoming packets of memory traffic trigger memory rules stored by the infrastructure processing unit. The incoming packets are routed to the central processing unit in a default mode when the incoming packets do not trigger the memory rules. Conversely, the incoming packets are routed to the infrastructure processing unit and bypass the central processing unit in an inline mode when the incoming packets trigger the memory rules.

Additionally, or alternatively, when operated as a memory architecture communicatively coupled to a central processing unit, the logic 804 receives a set of atomic transactions from the infrastructure processing unit that bypasses the central processing unit. The logic 804 then performs the set of atomic transactions from the infrastructure processing unit.

In one example, the logic 804 includes transistor channel regions that are positioned (e.g., embedded) within the substrate(s) 802. Thus, the interface between the logic 804 and the substrate 802 may not be an abrupt junction. The logic 804 may also be considered to include an epitaxial layer that is grown on an initial wafer of the substrate 802.

Additional Notes and Examples

Example 1 includes an infrastructure processing unit comprising one or more substrates and a logic coupled to the one or more substrates. The logic is implemented at least partly in one or more of configurable or fixed-functionality hardware. The logic is to: determine if one or more incoming packets of memory traffic trigger one or more memory rules stored by the infrastructure processing unit; route the one or more incoming packets to a central processing unit in a default mode when the one or more incoming packets do not trigger the one or more memory rules; and route the one or more incoming packets to the infrastructure processing unit and bypass the central processing unit in an inline mode when the one or more incoming packets trigger the one or more memory rules.

Example 2 includes the infrastructure processing unit of Example 1, wherein the logic is to, in the inline mode: extract operations to be performed from the one or more incoming packets; translate the extracted operations into a set of one or more read and write operations; and generate a set of one or more atomic transactions and one or more associated priority rankings based on the set of one or more read and write operations.

Example 3 includes the infrastructure processing unit of Example 2, wherein the logic is to send the set of one or more atomic transactions and the one or more associated priority rankings to a memory architecture associated with the central processing unit.

Example 4 includes the infrastructure processing unit of Example 1, wherein the logic coupled to the one or more substrates is to, in the inline mode: extract operations to be performed from the one or more incoming packets; translate the extracted operations into a set of one or more read-modify-write operations; generate a set of one or more atomic transactions based on the set of one or more read-modify-write operations; and send the set of one or more atomic transactions to a memory architecture associated with the central processing unit.

Example 5 includes the infrastructure processing unit of Example 1, wherein the logic is to perform one or more of a register operation, an update operation, or a removal operation with respect to the one or more memory rules.

Example 6 includes the infrastructure processing unit of Example 5, wherein the one or more memory rules comprise a memory range that identifies one or more network flows to be intercepted and redirected to a memory architecture associated with the central processing unit, and one or more priority rankings associated with a set of one or more atomic transactions.

Example 7 includes the infrastructure processing unit of Example 1, wherein the logic is to: register a set of one or more monitor operations based on a specified memory range associated with a specified monitor entity; and send the set of one or more monitor operations to a memory architecture associated with the central processing unit.

Example 8 includes the infrastructure processing unit of Example 7, wherein the logic is to: receive an alert from the memory architecture that the central processing unit has made one or more modifications within the specified memory range associated with the set of one or more monitor operations; and notify the specified monitor entity that the one or more modifications have been made within the specified memory range.

Example 9 includes a system comprising a central processing unit and a memory architecture communicatively coupled to the central processing unit. The memory architecture includes logic coupled to one more substrates. The logic is to: receive a set of one or more atomic transactions from an infrastructure processing unit that bypasses the central processing unit; and perform the set of one or more atomic transactions from the infrastructure processing unit.

Example 10 includes the system of Example 9, wherein the logic of the memory architecture is implemented in a memory monitor, wherein the logic is to: receive, from the infrastructure processing unit, a set of one or more monitor operations based on a specified memory range associated with a specified monitor entity; and report, to the infrastructure processing unit, an alert when the central processing unit has made one or more modifications within the specified memory range associated with the set of one or more monitor operations.

Example 11 includes the system of Example 9, wherein the logic of the memory architecture is implemented in a memory controller, wherein the logic is to: receive one or more associated priority rankings with the set of one or more atomic transactions from the infrastructure processing unit; host the set of one or more atomic transactions with the one or more associated priority rankings in a set of one or more queues; and perform the set of one or more atomic transactions based on the one or more associated priority rankings.

Example 12 includes the system of Example 11, wherein the logic is to: place one or more requests from the central processing unit on hold when the one or more requests interfere with the performance of the set of one or more atomic transactions based on the one or more associated priority rankings.

Example 13 includes the system of Example 11, wherein the logic is to: alternate performance of one or more requests from the central processing unit in a round robin with the performance of the set of one or more atomic transactions from the infrastructure processing unit based on the one or more associated priority rankings.

Example 14 includes the system of Example 9, wherein the logic of the memory architecture is implemented in one or more of the following components: a memory controller, a memory monitor, a Compute Express Link hub, a Compute Express Link peer-to-peer communication channel, or a dual in-line memory module.

Example 15 includes a method comprising: determining, via an infrastructure processing unit, if one or more incoming packets of memory traffic trigger one or more memory rules stored by the infrastructure processing unit; routing, via the infrastructure processing unit the one or more incoming packets to a central processing unit in a default mode when the one or more incoming packets do not trigger the one or more memory rules; and routing, via the infrastructure processing unit, the one or more incoming packets to the infrastructure processing unit and bypass the central processing unit in an inline mode when the one or more incoming packets trigger the one or more memory rules.

Example 16 includes the method of Example 15, further comprising, in the inline mode: extracting, via the infrastructure processing unit, operations to be performed from the one or more incoming packets; translating, via the infrastructure processing unit, the extracted operations into a set of one or more read and write operations; generating, via the infrastructure processing unit, a set of one or more atomic transactions and one or more associated priority rankings based on the set of one or more read and write operations; and sending, via the infrastructure processing unit, the set of one or more atomic transactions and the one or more associated priority rankings to a memory architecture associated with the central processing unit.

Example 17 includes the method of Example 15, further comprising, in the inline mode: extracting, via the infrastructure processing unit, operations to be performed from the one or more incoming packets; translating, via the infrastructure processing unit, the extracted operations into a set of one or more read-modify-write operations; generating, via the infrastructure processing unit, a set of one or more atomic transactions based on the set of one or more read-modify-write operations; and sending, via the infrastructure processing unit, the set of one or more atomic transactions to a memory architecture associated with the central processing unit.

Example 18 includes the method of Example 15, further comprising: performing, via the infrastructure processing unit, one or more of the following operations: register, update, or remove one or more of the one or more memory rules, wherein the one or more memory rules comprise a memory range that identifies one or more network flows to be intercepted and redirected to a memory architecture associated with the central processing unit, and one or more priority rankings associated with a set of one or more atomic transactions.

Example 19 includes the method of Example 15, further comprising: registering, via the infrastructure processing unit, a set of one or more monitor operations based on a specified memory range associated with a specified monitor entity; sending, via the infrastructure processing unit, the set of one or more monitor operations to a memory architecture associated with the central processing unit; receiving, via the infrastructure processing unit, an alert from the memory architecture that the central processing unit has made one or more modifications within the specified memory range associated with the set of one or more monitor operations; and notifying, via the infrastructure processing unit, the specified monitor entity that the one or more modifications have been made within the specified memory range.

Example 20 includes the method of Example 15, further comprising: receiving, via a memory architecture, the set of one or more atomic transactions from the infrastructure processing unit that bypasses the central processing unit; and performing, via the memory architecture, the set of one or more atomic transactions from the infrastructure processing unit.

Example 21 includes an apparatus comprising means for performing the method of any one of Examples 15 to 20.

Example 22 includes a machine-readable storage comprising machine-readable instructions which, when executed, implement the method of any one of Examples 15 to 20.

Technology described herein therefore is capable of providing a performance-enhanced computing platform to the extent that it may advantageously improve resource utilization (and improve end user experience). For example, technology described herein is advantageously capable of offloading some shared memory operations from a CPU to an IPU.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc.

may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An infrastructure processing unit comprising:
   a network interface circuit to couple to a central processing unit (CPU) and to a component in a COMPUTE EXPRESS LINK (CXL) memory architecture stack; and
   a semiconductor die to implement logic in one or more of configurable or fixed-functionality hardware, the logic to:
      determine if an incoming packet of memory traffic is part of an atomic CXL write transaction that triggers a memory rule stored by the infrastructure processing unit (IPU), the memory rule having an associated memory range shared by the CPU and the IPU;
      route the incoming packet to the CPU in a default mode when the incoming packet does not trigger the memory rule; and
      route the incoming packet through the IPU to the component in the CXL memory architecture stack, bypassing the CPU, in an inline mode when the incoming packet triggers the memory rule.

2. The infrastructure processing unit of claim 1, wherein in the inline mode, the logic is to:
   extract operations to be performed from the incoming packet for the atomic CXL write transaction;
   translate the extracted operations into a set of one or more write operations; and
   generate a set of one or more atomic transactions and one or more associated priority rankings based on the set of one or more write operations.

3. The infrastructure processing unit of claim 2, wherein the logic is to:
   send the set of one or more atomic transactions and the one or more associated priority rankings to the component of the CXL memory architecture stack.

4. The infrastructure processing unit of claim 1, wherein in the inline mode, the logic is to:
   extract operations to be performed from the incoming packet for the atomic CXL write transaction;
   translate the extracted operations into a set of one or more read-modify-write operations;
   generate a set of one or more atomic transactions based on the set of one or more read-modify-write operations; and
   send the set of one or more atomic transactions to the component of the CXL memory architecture stack.

5. The infrastructure processing unit of claim 1, wherein the logic is to:
   perform one or more of a register operation, an update operation, or a removal operation with respect to the memory rule.

6. The infrastructure processing unit of claim 5, wherein the memory range associated with the memory rule identifies one or more network flows to be intercepted and redirected to the component of the CXL memory architecture stack, and one or more priority rankings associated with a set of one or more atomic transactions.

7. The infrastructure processing unit of claim 1, wherein the logic is to:
   register a set of one or more monitor operations based on a specified memory range associated with a specified monitor entity; and
   send the set of one or more monitor operations to the component of the CXL memory architecture stack.

8. The infrastructure processing unit of claim 7, wherein the logic is to:
   receive an alert from the component of the CXL memory architecture stack that the CPU has made one or more modifications within the specified memory range associated with the set of one or more monitor operations; and
   notify the specified monitor entity that the one or more modifications have been made within the specified memory range.

9. A system comprising:
   a central processing unit (CPU);
   a memory architecture communicatively coupled to the CPU; and
   an infrastructure processing unit (IPU) coupled to the CPU and the memory architecture, the IPU and the CPU to share a memory range for COMPUTE EXPRESS LINK (CXL) memory, the IPU to determine if a packet of memory traffic is part of an atomic CXL write transaction that triggers a memory rule for the shared memory range, route the packet to the CPU in a default mode when the packet does not trigger the memory rule, and route the packet to the memory architecture, bypassing the CPU, in an inline mode when the packet triggers the memory rule;
   wherein, in the inline mode, logic of the memory architecture is to receive a set of one or more atomic transactions from the IPU; and perform the set of one or more atomic transactions from the IPU.

10. The system of claim 9, wherein the logic of the memory architecture is implemented in a memory monitor, wherein the logic is to:
    receive, from the IPU, a set of one or more monitor operations based on a specified memory range associated with a specified monitor entity; and
    report, to the IPU, an alert when the CPU has made one or more modifications within the specified memory range associated with the set of one or more monitor operations.

11. The system of claim 9, wherein the logic of the memory architecture is implemented in a memory controller, wherein the logic is to:
    receive one or more associated priority rankings with the set of one or more atomic transactions from the IPU;
    host the set of one or more atomic transactions with the one or more associated priority rankings in a set of one or more queues; and
    perform the set of one or more atomic transactions based on the one or more associated priority rankings.

12. The system of claim 11, wherein the logic is to:
    place one or more requests from the CPU on hold when the one or more requests interfere with the performance of the set of one or more atomic transactions based on the one or more associated priority rankings.

13. The system of claim 11, wherein the logic is to:
alternate performance of one or more requests from the CPU in a round robin with the performance of the set of one or more atomic transactions from the IPU based on the one or more associated priority rankings.

14. The system of claim 9, wherein the logic of the memory architecture is implemented in one or more of the following components: a memory controller, a memory monitor, a COMPUTE EXPRESS LINK hub, a COMPUTE EXPRESS LINK peer-to-peer communication channel, or a dual in-line memory module.

15. A method comprising:
determining, via an infrastructure processing unit (IPU), if an incoming packet of memory traffic is part of an atomic COMPUTE EXPRESS LINK (CXL) write transaction that triggers a memory rule stored by the IPU, the memory rule having an associated memory range shared by the IPU and a central processing unit (CPU);
routing, via the IPU, the incoming packet to the CPU in a default mode when the incoming packet does not trigger the memory rule; and
routing, via the infrastructure processing unit, the incoming packet through the IPU to a component in a CXL memory architecture stack, bypassing the CPU, in an inline mode when the incoming packet triggers the memory rule.

16. The method of claim 15, further comprising:
in the inline mode:
extracting, via the IPU, operations to be performed from the incoming packet for the atomic CXL write transaction;
translating, via the IPU, the extracted operations into a set of one or more write operations;
generating, via the IPU, a set of one or more atomic transactions and one or more associated priority rankings based on the set of one or more write operations; and
sending, via the IPU, the set of one or more atomic transactions and the one or more associated priority rankings to the component of the CXL memory architecture stack.

17. The method of claim 15, further comprising:
in the inline mode:
extracting, via the IPU, operations to be performed from the incoming packet for the atomic CXL write transaction;
translating, via the IPU, the extracted operations into a set of one or more read-modify-write operations;
generating, via the IPU, a set of one or more atomic transactions based on the set of one or more read-modify-write operations; and
sending, via the IPU, the set of one or more atomic transactions to the component of the CXL memory architecture stack.

18. The method of claim 15, wherein the memory rule is one of one or more memory rules associated with the memory range, and further comprising:
performing, via the IPU, one or more of the following operations: register, update, or remove one or more of the one or more memory rules, wherein the memory range associated with the one or more memory rules identifies one or more network flows to be intercepted and redirected to the component of the CXL memory architecture stack, and one or more priority rankings associated with a set of one or more atomic transactions.

19. The method of claim 15, further comprising:
registering, via the IPU, a set of one or more monitor operations based on a specified memory range associated with a specified monitor entity;
sending, via the IPU, the set of one or more monitor operations to the component of the CXL memory architecture stack;
receiving, via the IPU, an alert from the component of the CXL memory architecture stack that the CPU has made one or more modifications within the specified memory range associated with the set of one or more monitor operations; and
notifying, via the IPU, the specified monitor entity that the one or more modifications have been made within the specified memory range.

20. The method of claim 15, further comprising:
receiving, via the component of the CXL memory architecture stack, the atomic CXL write transaction from the IPU that bypasses the CPU; and
performing, via the component of the CXL memory architecture stack, the atomic CXL write transaction from the IPU.

* * * * *